Feb. 16, 1926. 1,573,167
E. W. ISOM ET AL
CONDENSATION OF HYDROCARBON VAPORS
Filed August 13, 1923
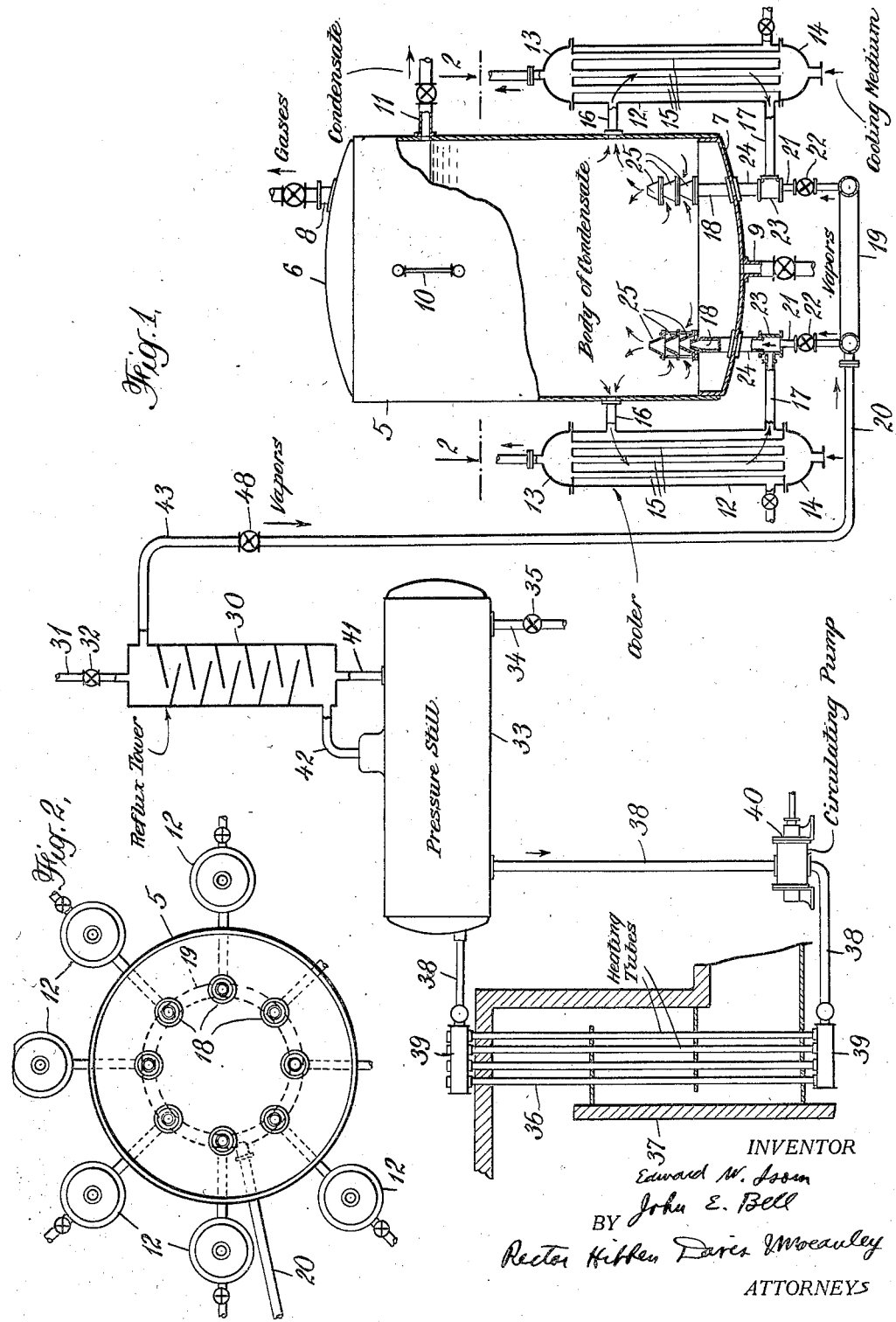
INVENTOR
Edward W. Isom
John E. Bell
BY
Rector Hibben Davis & McCauley
ATTORNEYS Patented Feb. 16, 1926.

1,573,167

UNITED STATES PATENT OFFICE.

EDWARD W. ISOM, OF WINNETKA, ILLINOIS, AND JOHN E. BELL, OF BROOKLYN, NEW YORK, ASSIGNORS TO SINCLAIR REFINING COMPANY, OF CHICAGO, ILLINOIS, A CORPORATION OF MAINE.

CONDENSATION OF HYDROCARBON VAPORS.

Application filed August 13, 1923. Serial No. 657,177.

*To all whom it may concern:*

Be it known that we, EDWARD W. ISOM and JOHN E. BELL, citizens of the United States, residing, respectively, at Winnetka, county of Cook, State of Illinois, and at Brooklyn, county of Kings, State of New York, have invented certain new and useful Improvements in Condensation of Hydrocarbon Vapors; and we do hereby declare the following to be a full, clear, and exact description of the invention, such as will enable others skilled in the art to which it appertains to make and use the same.

This invention relates to an improved method of condensation of hydrocarbon vapors, and more particularly to the condensation of cracked hydrocarbon vapors resulting from the cracking of petroleum oils under pressure in so-called pressure stills.

According to the present invention the hydrocarbon vapors are cooled and condensed by injecting them into a relatively large body of the condensate or pressure distillate produced by the cracking operation, and the cooling and condensing action is promoted by cooling a part of the condensate and injecting the hot gases under pressure into the cooled condensate, and then introducing the resulting mixture into the main body of the condensate in such a way as to promote the cooling and condensing action. The relatively large body of condensate is cooled by circulating streams of the condensate through coolers and returning the cooled liquid condensate, after the introduction of the vapors therein, back to the main body of condensate, the circulation of the liquid being effected by the injection of the vapors therein.

The invention further includes improvements in the method of bringing about intermixture of the hot vapors and of the condensate whereby the pressure of the vapors and admixed gases from the pressure still are utilized in circulating the condensate through the coolers and in bringing about intimate intermixture of the vapors with the cooled distillate and with a large body of condensate into which the admixed vapors and condensate are introduced.

In the practice of the invention a relatively large body of condensate is provided and maintained as a body into which the vapors are to be introduced and with which the added condensate from the vapors will mix; and this body of condensate is circulated through coolers to absorb the heat of condensation of the vapors. The vapors and admixed gases from the pressure still are then introduced into the cooled condensate, which is at a lower temperature than the main body of condensate, so that the vapors first come into contact with the condensate at a lower temperature than that of the main body of condensate. The vapors and admixed gases are moreover introduced in such a way as to bring about circulation of the condensate through the coolers as well as intimate intermixture of the vapors with the cooled condensate; and the condensate and uncondensed vapors and gases are then introduced into the main body of condensate in such a way as to subject the vapors to a further intimate intermixture with the condensate and to effect a thorough cooling and scrubbing of the vapors so that only the permanent gases and a minimum amount of condensable vapors escapes from the body of condensate.

The temperature of the body of condensate can be regulated by regulating the cooling effect to which the circulating condensate is subjected and can be maintained at a sufficiently low temperature to prevent escape of any objectionably large amount of uncondensed vapors.

The condensation of the vapors results in the production of additional amount of pressure distillate or condensate of the same character as that into which the vapors are introduced and by which they are condensed, so that extraneous liquids are kept from direct contact with the condensed vapors. The condensate may be drawn off in proportion to the added amount of pressure distillate condensed and this withdrawal can be automatically controlled by providing a suitable overflow from the condensing apparatus. The fixed gases and any unabsorbed vapors are collected and drawn off to a suitable place of storage or use.

The invention will be further described in connection with the accompanying drawings which show somewhat diagrammatically and partly in section a suitable apparatus for carrying out the process of the present invention.

In the accompanying drawings,

Fig. 1 is a diagrammatic and partially sectional representation of a pressure still and condensing apparatus capable of operation in accordance with the present invention; and Fig. 2 is a section of the condensing apparatus on the line 2—2 of Fig. 1.

It will be evident that the pressure still may be of different construction and the pressure still illustrated is merely for purposes of exemplification. In the cracking of petroleum oils in a pressure still the entire body of cracked vapors may be withdrawn or these vapors may be refluxed under pressure and the reflux returned to the cracking system, while only the uncondensed vapors and fixed gases escape to the condenser. The pressure still illustrated is one in which refluxing of the heavier vapors takes place and only the lighter vapors such as are commonly condensed as pressure distillate, are withdrawn to the condenser. The operation of the condenser, however, and the method of cooling and condensation will be the same with pressure stills of different constructions and with pressure distillates of varying composition. The condensing apparatus itself which is illustrated in the drawing forms the subject-matter of our companion application Serial No. 470,790, filed May 19, 1921.

Referring to the drawings, the tank or receptacle 5, in which a body of liquid condensate is maintained, is a vertical cylinder with closed top and bottom 6 and 7. A connection 8 is provided for the withdrawal or escape of fixed or permanent gases and a connection 9 for draining the tank. The tank is provided with a liquid level gauge 10 and a connection 11 for withdrawing the accumulated condensate, preferably provided at or near the normal level at which the liquid condensate is to be maintained, so that the condensate may escape by overflow. The coolers 12 comprise upper and lower headers 13 and 14, connected by tubes 15 through which a cooling fluid is circulated. Liquid condensate is circulated through the space between the headers and about the tubes in the coolers 12 through connections 16 and 17, both connections being below the normal liquid level in the tank. Nozzles 18 are provided for the reintroduction of the condensate admixed with the vapors and gases into the main body of liquid condensate in the tank 5.

The vapors to be condensed and admixed gases are introduced into the condensate on its way from the coolers back to the main body of condensate. These vapors and gases are forced under pressure through the pipe 20 leading from the pressure still and enter the circulating stream of pressure distillate through tubes 21 so arranged as to exert an injector action and to bring about a rapid circulation of the condensate through the coolers. Regulating valves 22 control the introduction of gases into the individual circulating systems. A manifold 19 connects the vapor pipe 20 with the individual tubes 22. In the apparatus illustrated the tubes 22 discharge into enlarged elbow members 23 and the resulting mixture of condensate and vapors passes upwardly through the connecting pipes 24 terminating in nozzles 18. Arranged above the nozzles 18 are a series of frusto-conical deflectors 25 which are secured in spaced relation in any suitable manner so as to leave between them passages for the condensate in the tank.

The pressure still illustrated is of the general construction described in U. S. Patent No. 1,285,200, granted to the Sinclair Refining Co. upon an application of Edward W. Isom. This pressure still, which is illustrated in a diagrammatic and conventional manner, comprises the bulk supply tank 33 in which a considerable body of oil is maintained, vertical heating tubes 36 suitably arranged in the heating flue of a furnace 37, and pipe connections 38 connecting the headers 39 of the vertical tubes with the bulk supply tank 33. A pump 40 circulates the oil from the bulk supply tank through the heating tubes and back to the bulk supply tank. A tar draw-off is shown at 34 with valve 35 therein. A reflux tower 30 is arranged above the still and receives the vapors therefrom through the vapor line 42, while the condensed vapors return to the still through the pipe 41. A pipe 31 with regulating valve 32 therein permits the introduction of feed oil to the top of the reflux tower. The uncondensed vapors escape from the top of the tower through the vapor line 43 having the pressure-regulating and reducing valve 48 therein.

In the operation of such a pressure still the oil is rapidly circulated through the heating tubes and the entire body of oil is maintained at a cracking temperature and under high pressure, for example, a pressure of around 90–125 pounds where gas oil is the oil subjected to the cracking operation, although considerably higher pressures may be used.

The vapors and admixed gases escaping from the still may have their pressure reduced from still pressure to a much lower pressure by means of the valve 48, but it will be evident that any desired pressure between atmospheric and the pressure maintained in the pressure still can be obtained in the pipe 20, and that the tubes 21 may be of a restricted size such that they introduce considerable resistance and require a relatively high pressure to force the gases therethrough. The valves 22 may also serve in part as pressure-reducing valves. With the high pressure gases from the still supplied under the necessary pressure, and with the tubes or pipes 21 constructed and arranged to act as injector inlets for introducing the gases, it will be evident that these gases can be discharged at a high velocity into the condensate, and that this injector action of the gases will assist in obtaining an intimate intermixture of the vapors and liquid and will force the liquid with considerable velocity through the nozzle 28 such that a further entraining action will be obtained in the passage of the returned condensate and uncondensed vapors upwardly into the main body of condensate, this action being assisted by the airlift action of the uncondensed vapors and fixed gases.

The pressure maintained in the tank 5 may be either atmospheric or at a pressure considerably above atmospheric. The high pressure at which pressure stills are operated enables the condenser to be maintained under a relatively high pressure which is nevertheless sufficiently below that of the pressure still, so that the vapors and admixed gases from the pressure still will be forced into the body of condensate and will serve to bring about the circulation of the condensate in the manner described.

The coolers 12 may be cooled by any suitable medium such as cold water, brine, ammonia, etc., so that the condensate escaping therefrom will be cooled considerably below the temperature of the main body of condensate. It is desirable that the cooling thus supplied should be sufficient to take care of the heat of the vapors coming from the pressure still so that the temperature of the main body of condensate will not be raised above that which it is desired to maintain by the heat required to cool and condense the still vapors.

The circulation of portions of the condensate through the coolers and back to the main body of condensate and the introduction of the condensate in the manner described maintains a sufficient agitation and circulation of the entire body of condensate to secure substantial uniformity of temperature and effective condensation of the vapors and scrubbing of the gases. This agitation and circulation, as well as the desired condensation and scrubbing, is promoted by the frusto-conical deflectors arranged as they are to provide a series of mixing nozzles such that the upward discharge of condensate and vapors and gases through the nozzles 18 will effect a further mixing and entrainment of additional distillate and thus promote the desired condensation.

It will thus be seen that the present invention provides an improved method of condensation of pressure distillate from pressure stills and of similar hydrocarbon gases supplied by sources thereof under pressure, and that the pressure of the vapors is employed to advantage in bringing about circulation of the condensate into which the vapors are injected. It will further be seen that the condensing action is obtained by maintaining a relatively large body of the pressure distillate and by drawing off separate streams through coolers and cooling them to a temperature below that of the main body of distillate and then introducing the hot vapors into the condensate so cooled, so that the heat of the vapors is absorbed in heating the cooled condensate up to the temperature of the main body of condensate. The condensing action is thus brought about largely by intermixture of the hot vapors with streams of condensate at a temperature below that of the main body of condensate, while completion of the condensation and absorption and scrubbing of the gases is secured by a further intimate contact of the uncondensed vapors and fixed gases with the large body of condensate in their upward passage therethrough.

We claim:

1. The improvement in the condensation of hydrocarbon vapors which comprises withdrawing a stream of liquid condensate of the vapors from a body of the condensate, cooling the stream of condensate so withdrawn, mixing the vapors with this cool stream, and injecting the mixed vapors and cooled stream into the body of condensate.

2. The improvement in the condensation of hydrocarbon vapors from pressure stills which comprises circulating a stream of condensate of the vapors through a cooler from and to a relatively large body of the condensate and cooling the circulating condensate and injecting the vapors from the pressure still into this stream between the cooler and the large body of condensate.

3. The improvement in the condensation of hydrocarbon vapors which comprises withdrawing liquid condensate from a relatively large body of condensate of the vapors, cooling this withdrawn condensate, mixing the vapors with this cooled condensate and returning this mixture to the body of condensate.

4. The improvement in the condensation of hydrocarbon vapors which comprises mixing the vapors with a stream of freshly cooled condensate of the vapors, mixing this mixture with a further amount of the liquid condensate and injecting this final mixture into a relatively large body of the condensate.

5. The improvement in the condensation of hydrocarbon vapors from pressure stills which comprises circulating a stream of condensate of the vapors through a cooler from and to a relatively large body of the condensate and cooling the circulating condensate, injecting the vapors from the pressure still into this stream between the cooler and the large body of condensate, and maintaining the circulation by the injection of the vapors in concurrent flow with the circulating stream.

6. The improvement in the condensation of hydrocarbon vapors from pressure stills which comprises reducing the pressure of the vapors from the pressure still, then injecting the vapors at this lower pressure into a stream of condensate of the still vapors and introducing the resulting stream of condensate and admixed vapors into a large body of the condensate, the stream of condensate into which the vapors are injected being cooled below the temperature of the main body of condensate.

7. The improvement in the condensation of hydrocarbon vapors from pressure stills which comprises maintaining a relatively large body of condensate from said vapors, drawing off a part of said condensate and cooling it below the temperature of the main body of condensate, reducing the pressure of the vapors from the pressure still and injecting them into the cooled condensate and discharging the resulting mixture into the main body of condensate.

In testimony whereof we affix our signatures.

EDWARD W. ISOM.
JOHN E. BELL.